Dec. 10, 1963

J. W. KOHLMAN 3,113,433

BRAKE SYSTEM

Filed March 7, 1962

INVENTOR
JOHN W. KOHLMAN
BY
Teare, Fetzer & Teare
ATTORNEYS

Dec. 10, 1963   J. W. KOHLMAN   3,113,433
BRAKE SYSTEM

Filed March 7, 1962                                    2 Sheets-Sheet 2

INVENTOR.
JOHN W. KOHLMAN
BY
Teare, Fetzer & Teare
ATTORNEYS

United States Patent Office 3,113,433
Patented Dec. 10, 1963

3,113,433
BRAKE SYSTEM
John William Kohlman, 1432 E. 260th St., Euclid, Ohio
Filed Mar. 7, 1962, Ser. No. 178,036
4 Claims. (Cl. 60—54.6)

This invention relates in general to brakes, and more particularly to a fluid actuating system for motor vehicle brakes.

In present day practice, it is conventional to provide automotive type vehicles with power brakes to facilitate with less effort, the application of the brakes by the vehicle operator. Such power braking systems are expensive in the first instance, and generally necessitate considerable repair thereof from time to time, as various components thereof wear out and fail.

The present invention provides a fluid actuating braking system, including a plurality of master cylinders, for separate but simultaneous actuation of the front and rear wheel brakes of a vehicle, and which system includes means for materially increasing the effective force able to be applied by the operator to the pistons of such master cylinders, and without increasing the necessary manual effort of the operator.

Accordingly, an object of the present invention is to provide an improved arrangement of fluid pressure actuating system for braking mechanisms.

Another object of the invention is to provide an improved arrangement of fluid pressure actuating system for the braking mechanism of automotive vehicles, and wherein such system includes dual master cylinder arrangements for separately but simultaneously actuating the braking mechanisms of respectively the front and rear wheels of the vehicle, and including a novel linkage arrangement for increasing the effective force able to be applied by the vehicle operator to the pistons of the master cylinders.

A further object of the invention is to provide a fluid pressure actuating system of the above type wherein the master cylinders are mounted on the outer side of the fire wall of the vehicle for ready accessibility to the master cylinders and wherein the force applied to the pistons of the master cylinders by the vehicle operator is applied in a direction toward such outer side of the fire wall.

A still further object of the invention is to provide a fluid pressure actuating system of the above mentioned type including means for readily adjusting the linkage mechanism and thus adjusting the "play" in the brakes of the vehicle, so as to readily compensate for the usual increased wear of the front wheel brake shoes as compared to the wear of the rear wheel brake shoes of the vehicle.

A still further object of the invention is to provide a novel hydraulic braking system of the above mentioned character that may be installed on a vehicle with minimum difficulty and at relatively low cost, either as replacement of the conventional braking system already utilized, or which may be readily installed as part of the original vehicle equipment, and which novel braking system is rugged in construction and trouble-free in operation.

Other objects and advantages of the invention will be apparent from the following description taken in conjunction with the accompanying drawings, wherein.

Figure 1:
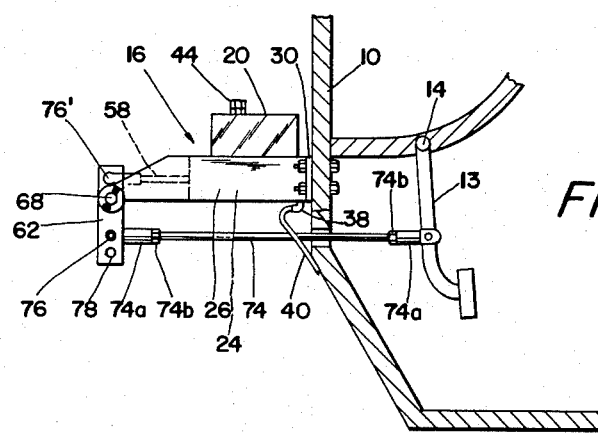
FIG. 1 is a generally diagrammatic, fragmentary, sectional elevational view of the fire wall of a vehicle, and showing the fluid actuating system, for actuating the front and rear wheel brakes of the vehicle, in mounted condition on the vehicle structure.
Figure 2:
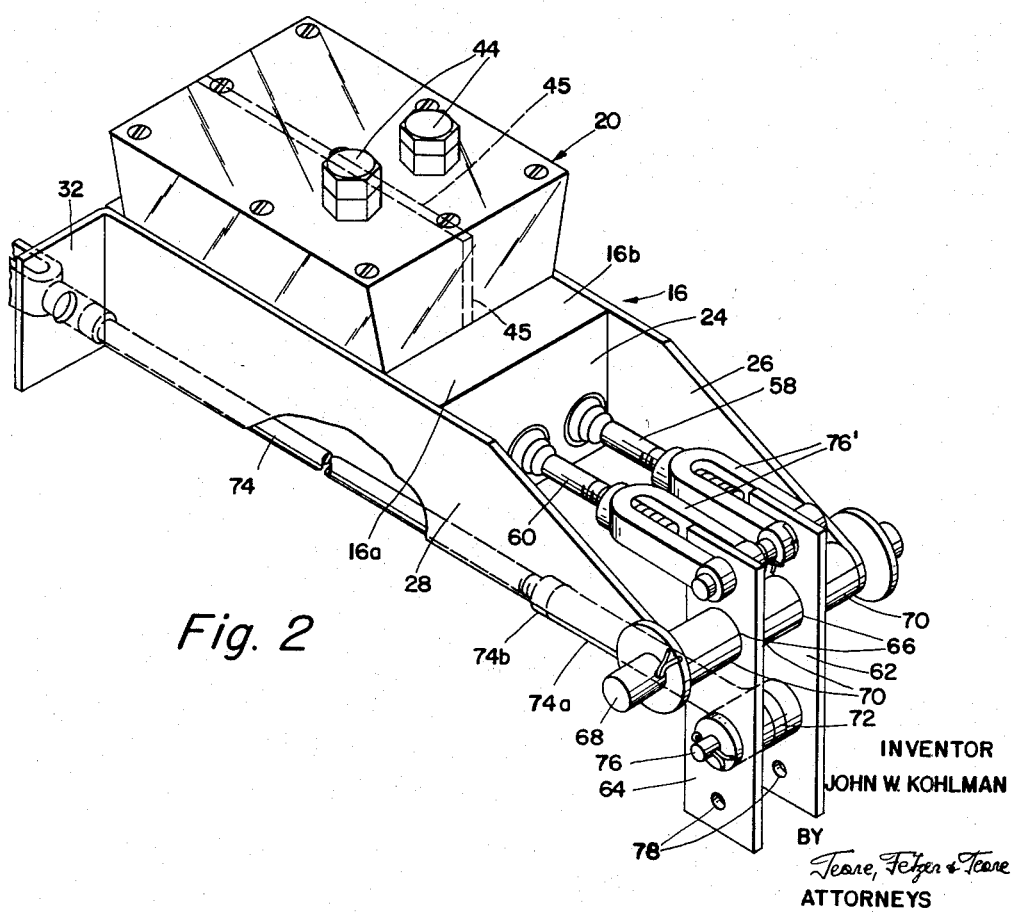
FIG. 2 is a generally perspective view of the dual arrangement of master cylinders and the fluid reservoir means therefor, and illustrating the novel linkage arrangement for increasing the effective force able to be applied by the vehicle operator to the pistons of the master cylinders.
Figure 3:
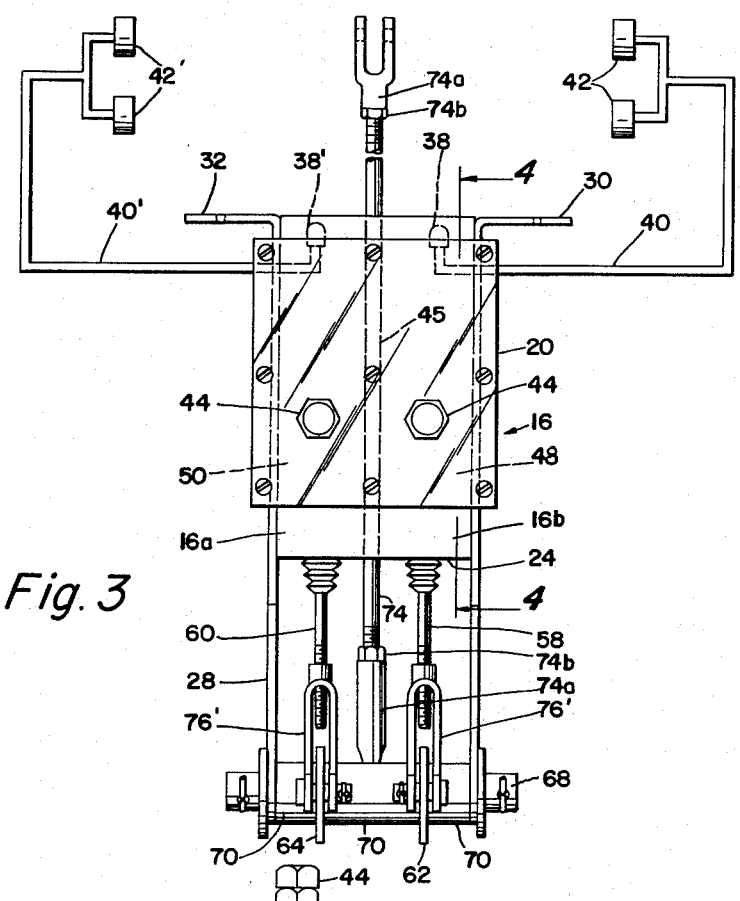
FIG. 3 is a top plan view of the FIG. 2 mechanism, and also illustrating diagrammatically the connection of the outlet port of each of the master cylinders with respectively the brake mechanism for the front wheels of the vehicle, and the brake mechanism for the rear wheels of the vehicle.

Referring now again to the drawings, and in particular to FIG. 1 thereof, there is illustrated a fire wall 10 of the vehicle and the brake pedal including arm 13, pivoted as at 14 to the vehicle structure, and adapted for actuation by a foot of the vehicle operator, to actuate the vehicle's front and rear wheel brake mechanisms.

A master cylinder assembly 16, comprising a pair of master cylinders 16a, 16b, preferably disposed in side-by-side relationship, and having a reservoir 20 mounted on the top thereof, is secured to the fire wall 10. The master cylinders may be formed in a block-like casting 24, which may be secured by any suitable means, such as threaded fasteners or welding or the like, to side flange members 26 and 28, for holding the block-like casting in desired position on the outer or readily accessible side of the fire wall. Side flanges 26 and 28 at their inner or rearward ends may be bent outwardly to provide bracket portions 30 and 32, with the latter being preferably provided with apertures therethrough, for readily mounting or dismounting the master cylinder assembly on or from the fire wall 10.

Figure 4:
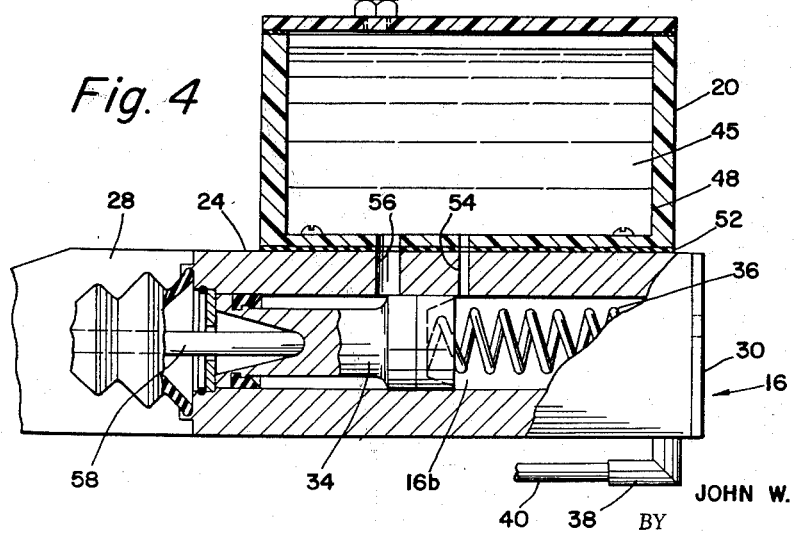
FIG. 4 is a vertical sectional view taken generally along the plane of line 4—4 of FIG. 3, looking in the direction of the arrows.

Each master cylinder may be of more or less conventional construction, having a piston 34 therein (FIG. 4) which engages one end of a compression spring 36, and the other end of which may receive the usual check valve (not shown) for the associated master cylinder. Upon axially inward movement, or movement toward the right, with respect to FIG. 4, of the master cylinder piston, the braking fluid is compressed and applied via the respective outlet port 38, 38' to the associated hose 40, 40' which communicates with the respective conventional brake shoe actuating cylinders 42, 42' of either the front or the rear wheels of the vehicle.

The aforementioned reservoir 20 is preferably of transparent plastic material, generally providing full visibility of the interior of the reservoir, so that the level of brake fluid therein can be easily checked, without removing the filler cap members 44. The reservoir is preferably divided, as at 45 by a partition, so that each section 48 and 50 of the reservoir communicates only with its respective master cylinder. Gasket means 52 may be provided for sealing the reservoir with respect to master cylinder block 24, and the reservoir sections with respect to one another. Each master cylinder is provided with conventional by-pass and intake ports 54 and 56 respectively, communicating with the respective reservoir section. Accordingly, if brake fluid should be lost in the line 40 or 40' leading to respectively the front wheels and the rear wheels, due to for instance rupture of the line or failure of the associated wheel cylinders, pressure will be lost only in the particular master cylinder associated with that line, and accordingly, the vehicle will still possess braking power either on its front or its rear wheels. The side walls of the reservoir are preferably inwardly sloping in a downward direction so that dirt will tend not to adhere to such side walls, and thus ensure effective visibility into the interior of the reservoir.

The piston of each of the master cylinders 16a, 16b is connected by means of an associated piston rod 58, 60 to a respective, generally vertically extending link or lever 62, 64, each of which is pivoted as at 66 to a generally horizontally extending shaft 68 mounted on the forward ends of the side plates 26, 28 of the master cylinder assembly. This shaft 68 is readily removable and is maintained in position by, for instance, cotter pins at the ends of the shaft.

The links 62, 64 may be spaced from one another by bushings 70 and thus are held in predetermined location but in pivotal condition on shaft 68. The levers 62, 64 preferably extend downwardly below the level of the bottom edge of the side plate members 26, 28 and are detachably connected as at 72 to a connecting rod 74 which extends between a shaft or cross member 76 mounted on the levers, and the brake pedal arm 13. Each end of the connecting rod is preferably provided with a turn buckle-like sleeve 74a, including lock nuts 74b, for readily adjusting the length or throw of the connecting rod, and while the master cylinder assembly is in mounted condition on the fire wall of the vehicle. Piston rods 58, 60 are also each preferably provided with a threaded clevis 76', for adjusting the length of each associated master piston rod.

It will be noted that the levers 62, 64 are provided with a plurality of spaced openings 78 therein so that the distance between the pivot point 66 of the lever, and the connecting point 72 of the connecting rod to the levers may be varied.

Upon actuation of the brake pedal 12 by the vehicle operator, the connecting rod 74 transmits force to the forwardly disposed levers 62, 64 which pivot about their mounting shaft member 68, thus actuating the master piston rods 58, 60 inwardly, which causes inward movement of the associated master cylinder pistons 34, thereby applying the brakes to the vehicle. It will be seen that the force applied to the piston rods 58, 60 by the vehicle operator is multiplied due to the lever arrangement illustrated and more particularly by having the distance between the axis of lever mounting shaft 68 and the coupling 72 of the connection rod to the lever being greater than the distance between the axis of shaft 68 and the master piston rod couplings 76' to the levers As wear occurs on the brake shoes of the braking system, the adjustment of the length of the master piston rods 58, 60 and adjustment of the connecting rod 74 may be readily accomplished, to cause effective application of the brakes and without any undesirable free play or uneven application occurring.

It will be seen that since the force is applied to the master cylinder pistons from the forward end of the master cylinder assembly, there is no possibility of inadvertently tearing or loosening such assembly from the fire wall during application of the brakes.

The block-like member 24 forming the master cylinder enclosures is preferably made from aluminum, anodized to prevent any material wear and oxidation thereof, and will last indefinitely, the only parts of the master cylinder assembly ever needing any real attention being the conventional rubber cups on the pistons.

While the linkage arrangement of the invention has been illustrated in connection with a plural master cylinder arrangement, it could be utilized with a single master cylinder to increase the effective force applied to the master cylinder piston.

From the foregoing discussion and accompanying drawings it will be seen that the invention provides a novel arrangement of fluid pressure actuating system for braking mechanism, and wherein there may be provided plural master cylinder arrangements for separately but simultaneously actuating the braking mechanisms of respectively the front and rear wheels of a vehicle, and which incudes a novel arrangement for increasing the effective force able to be applied by the vehicle operator to the pistons of the master cylinders, assuming a predetermined application of force to the brake pedal by the operator. The invention also provides a fluid pressure actuating mechanism rugged and long wearing in construction, and one which may be readily substituted for conventional systems found in present day vehicles.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. In a fluid pressure brake system for automotive type vehicles comprising, at least two master cylinders disposed in side-by-side relation for supplying fluid under pressure to said brake system, a piston in each of said cylinders and a piston rod connected to each of the respective of said pistons, pivotal means operatively coupled to each of said piston rods for actuation of the latter and adapted for pivotal movement in a generally vertical plane, reciprocating means adapted to extend through said fire wall, said reciprocating means operably coupled at one end to said pivotal lever means and at its other end to a foot brake pedal of a vehicle such that depression of the brake pedal actuates said reciprocating means in a direction away from said fire wall causing rotation of said pivotal lever means and simultaneous actuation of said piston rods in a direction opposite to movement of said reciprocating means toward said fire wall, whereby the force applied to the respective of said cylinders is translated in a direction toward said fire wall during application of said braking system.

2. A fluid pressure brake system in accordance with claim 1, wherein the pivotal axis of said pivotal lever means is disposed intermediate the connection of said piston rods to said lever means and the connection of said reciprocal means to said pivotal lever means, the distance between the connection of said reciprocal means and said pivotal axis being greater than the distance between said pivotal axis and the connection of said piston rods to said lever means for increasing the effective force applied to said piston rods during application of said braking system.

3. A braking system in accordance with claim 1, wherein said pivotal lever means includes two spaced parallel arms pivoted intermediate therein about a generally horizontally extending axis, and wherein one of the piston rods is operably connected to one of said arms, and the other piston rod is operably connected to the other of said arms, the connections being on one side of the horizontal pivotal axis, and the reciprocating means being operably connected to the arms on the other side of the horizontal pivotal axis.

4. A fluid pressure brake system in accordance with claim 1, including first attachment means for connecting one of said piston rods to said pivotal lever means and a second attachment means for connecting the other of said piston rods to said pivotal lever means, and each of the attachment means being adjustable so that the length of the stroke of each of the respective piston rods can be independently and selectively controlled relative to each other.

References Cited in the file of this patent

UNITED STATES PATENTS

| | | |
|---|---|---|
| 2,018,685 | Sanzedde | Oct. 29, 1935 |
| 2,029,087 | Thomas | Jan. 28, 1936 |
| 2,131,459 | Weatherhead | Sept. 27, 1938 |
| 2,160,074 | La Brie | May 30, 1939 |
| 2,162,114 | Oliver | June 13, 1939 |
| 2,247,827 | Wegmann | July 1, 1941 |
| 2,328,685 | Schnell | Sept. 7, 1943 |
| 2,356,517 | Hale | Aug. 22, 1944 |
| 2,375,415 | Hollowell et al. | May 8, 1945 |
| 2,510,651 | Osburn | June 6, 1950 |
| 2,755,629 | Baisch | July 24, 1956 |
| 2,902,121 | Young et al. | Sept. 1, 1959 |
| 2,947,145 | Choate et al. | Aug. 2, 1960 |
| 2,986,428 | Clements | May 30, 1961 |